United States Patent [19]

Watanabe et al.

[11] Patent Number: 5,682,202
[45] Date of Patent: Oct. 28, 1997

[54] APPARATUS FOR RECORDING/ REPRODUCING VIDEO DATA IN A MEMORY CARD ON A CLUSTER BASIS

[75] Inventors: Mikio Watanabe; Kenji Moronaga, both of Tokyo, Japan

[73] Assignee: Fuji Photo Film Co., Ltd., Kanagawa, Japan

[21] Appl. No.: 200,573

[22] Filed: Feb. 22, 1994

Related U.S. Application Data

[63] Continuation of Ser. No. 623,524, Dec. 7, 1990, abandoned.

[30] Foreign Application Priority Data

Dec. 8, 1989 [JP] Japan .................. 1-317797
Dec. 18, 1989 [JP] Japan .................. 1-326118
Dec. 18, 1989 [JP] Japan .................. 1-326119

[51] Int. Cl.$^6$ ................................. H04N 5/781
[52] U.S. Cl. .............. 348/231; 358/909.1; 395/442; 395/430
[58] Field of Search .............. 394/400 MS, 425 MS; 358/433, 909.1; 348/207, 231; 395/442, 430, 481

[56] References Cited

U.S. PATENT DOCUMENTS

| | | | |
|---|---|---|---|
| 3,829,837 | 8/1974 | Farr, Jr. ...................... | 395/425 |
| 4,754,394 | 6/1988 | Brantley et al. ............... | 364/200 |
| 4,930,014 | 5/1990 | Maeda et al. ................. | 358/209 |
| 4,985,848 | 1/1991 | Pfeiffer et al. ............... | 364/518 |
| 5,016,107 | 5/1991 | Sasson et al. ................ | 358/209 |
| 5,018,017 | 5/1991 | Sasaki et al. ................ | 358/209 |
| 5,029,125 | 7/1991 | Sciupac ....................... | 395/600 |
| 5,034,804 | 7/1991 | Sasaki et al. ................ | 358/41 |
| 5,068,744 | 11/1991 | Ito ............................ | 358/310 |
| 5,130,813 | 7/1992 | Ole et al. ..................... | 358/335 |

FOREIGN PATENT DOCUMENTS 2193236  7/1990  Japan.

Primary Examiner—David L. Robertson

[57] ABSTRACT

A picture recording apparatus includes a first storage having storing units, or clusters, each of which has a predetermined capacity for accommodating video data, and thereby writing video data in the first storage on a cluster basis. An inputting section receives video data to be stored in the first storage. A second storage stores in a predetermined order address data each designating, from among the clusters of the first storage, a particular unoccupied cluster. A controller searches, before writing video data in the first storage, for unoccupied clusters and writes in the second storage first address data which designate clusters necessary for accommodating the video data. A data amount determining section determines the amount of video data outputted by the inputting section and outputs, when the amount of video data matches a single cluster, a first signal for commanding the writing of the video data to the next cluster and a second signal for inhibiting the outputting operation of the inputting section. An address generating section is responsive to the first signal for reading address data representative of the next storing unit out of the second storage, generates a real address on the basis of the address data, and feeds the real address to the first storage. A selecting section selects either one of the output signals of the address generating section and inputting section and selectively feeds either one of the selected output signals and the address data outputted by the controller to the first storage.

19 Claims, 13 Drawing Sheets

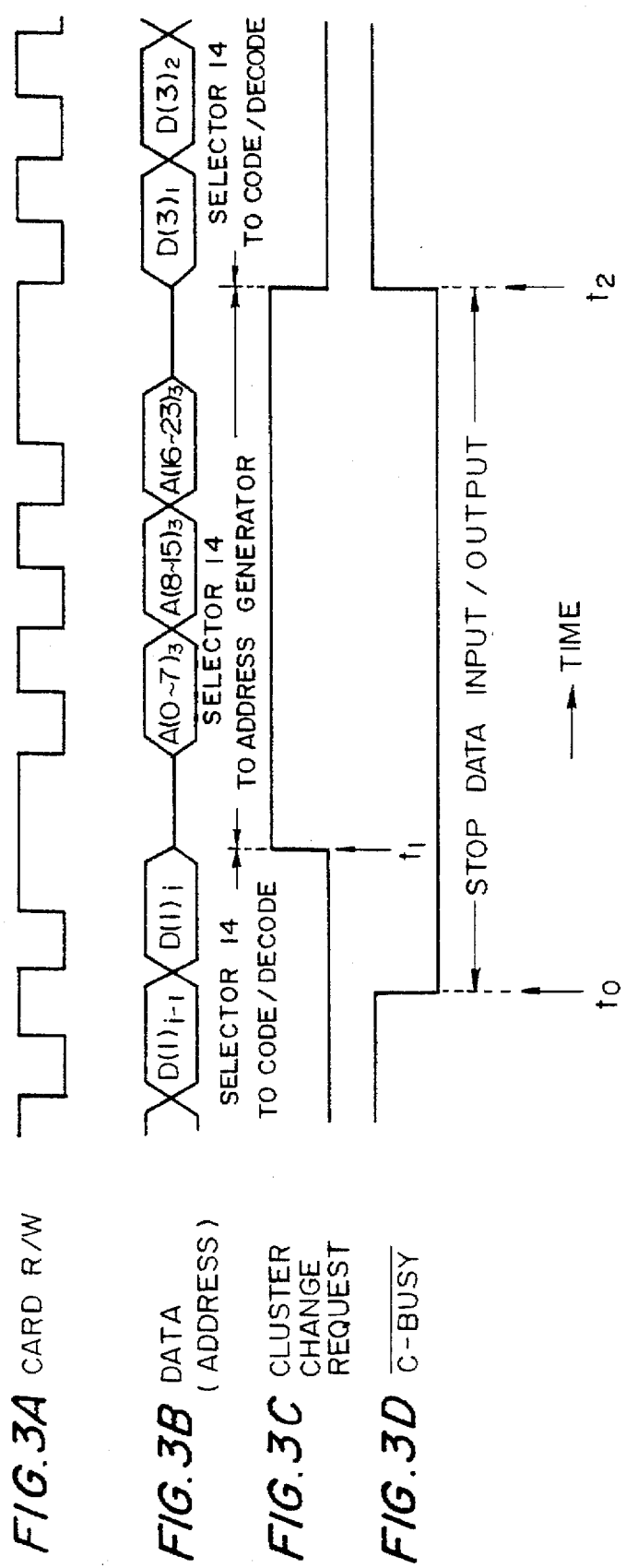

FIG. 8
DIRECTORY AREA
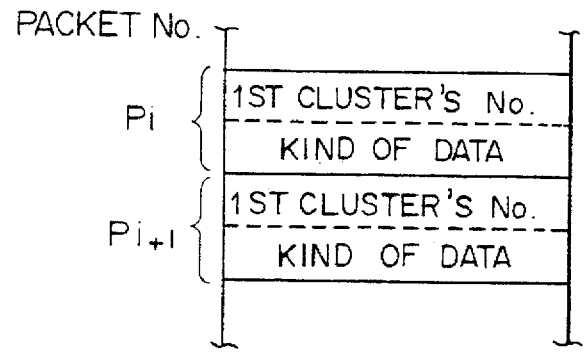
FIG. 9
PACKET ATTRIBUTE AREA
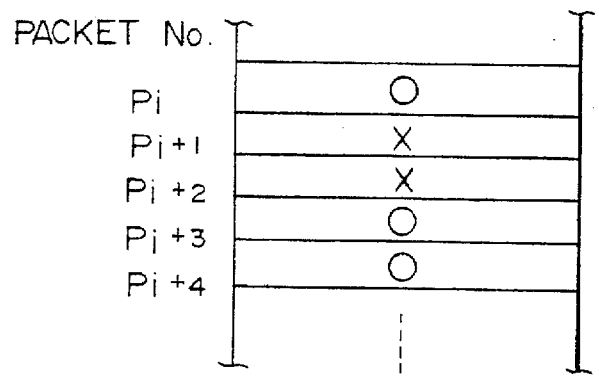
FIG. 10
MAT-RAM
| No. 1 |
| No. 3 |
| No. N |
| No. N+i |
| No. N+j |

FIG. 12

| AREA | ADDRESS (HEXADECIMAL) | BYTE | CONTENT |
|---|---|---|---|
| HEADER | 000000 | 1 | CARD No. |
| | 000001~0004 | 4 | KIND OF MEMORY |
| | 000005~0006 | 2 | NUMBER OF REMAINING CLUSTERS |
| | 000007~0008 | 2 | NUMBER OF PACKETS USED |
| | 000009~03FF | 1015 | USER AREA |
| PACKET INFORMATION AREA | 000400 | 1 | CONTENT OF PACKET 1 |
| | 000401 | 1 | CONTENT OF PACKET 2 |
| | ⟨ | ⟨ | ⟨ |
| | 0007FE | 1 | CONTENT OF PACKET 1023 |
| | 0007FF | 1 | DUMMY AREA |
| DIRECTORY | 000800~0801 | 2 | PACKET 1 START CLUSTER |
| | 000802~0803 | 2 | PACKET 2 START CLUSTER |
| | ⟨ | ⟨ | ⟨ |
| | 000FFC~0FFD | 2 | PACKET 1023 START CLUSTER |
| | 000FFE~0FFF | 2 | DUMMY AREA |
| MAT | 001000~1001 | 2 | CLUSTER 1 MAT |
| | 001002~1003 | 2 | CLUSTER 2 MAT |
| | ⟨ | ⟨ | ⟨ |
| | 0017FC~17FD | 2 | CLUSTER 1023 MAT |
| | 0017FE~17FF | 2 | DUMMY AREA |
| | 001800~1FFF | 2048 | SPARE |
| DATA | 002000~ | | VIDEO DATA (INCLUDING HEADER INFORMATION) |

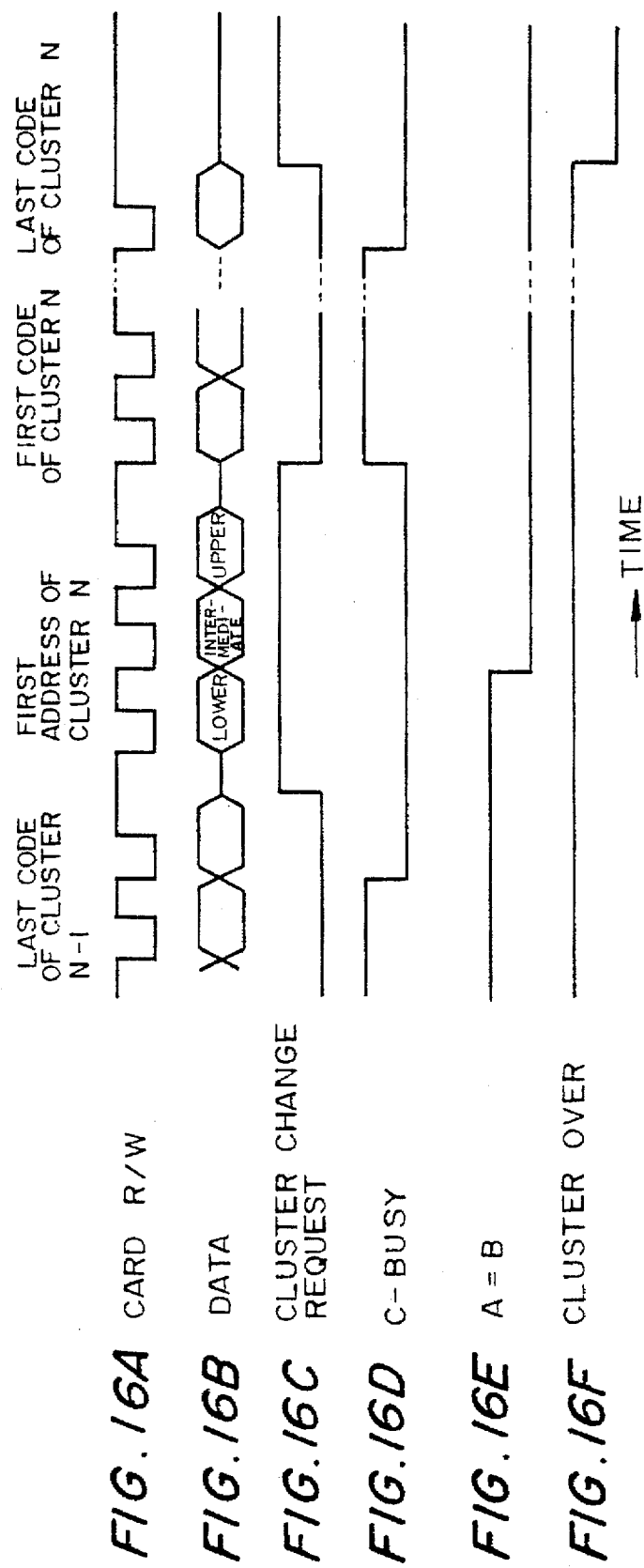

APPARATUS FOR RECORDING/ REPRODUCING VIDEO DATA IN A MEMORY CARD ON A CLUSTER BASIS

This application is a continuation of application Ser. No. 07/623,524 filed on Dec. 7, 1990, now abandoned.

BACKGROUND OF THE INVENTION

1. Field of the Invention

The present invention relates to a picture recording/ reproducing apparatus of the type when writes digital video data in a semiconductor memory after coding the video data by compression or decoding video data by expansion after reading the video data out of the memory. The picture recording/reproducing apparatus to which the present invention pertains is advantageously applicable to a digital electronic still camera, for example.

2. Description of the Related Art

A digital electronic still camera belongs to a family of picture recording/reproducing apparatuses of the type described. A digital electronic still camera has a solid state imaging device for shooting a desired field. In a record mode, video data representative of the field shot by the imaging device is written to a semiconductor memory which is associated with the camera while, in a playback mode, video data representative of a picture is read out of the memory to reproduce the picture.

The semiconductor memory for use with this type of picture recording/reproducing apparatus is usually implemented as a memory card. The memory card has its storage area segmented into a plurality of storing units, so that pictures of different sizes may be efficiently stored therein. The storing units will hereinafter be referred to as clusters. Serial numbers are assigned to the individual clusters of the memory card. Video data representative of a single picture, for example, is written to a plurality of clusters whose numbers may be or may not be continuous. Recording video data in one or more clusters depending on the amount of data as stated is disclosed in, for example, JP patent laid-open publication No. 193236/1990 assigned to the same assignee as the present application.

The above-stated recording method allocates, among the plurality of clusters of the memory, the first cluster to supervisory data and the second and successive clusters to video data representative of pictures. The cluster allocated to supervisory data, or supervisory area, has a directory and a MAT (Memory Allocation Table). Assuming that compressed data is recorded in a plurality of clusters, the number assigned to a cluster for storing the first video data is recorded in the directory of the supervisory area while the numbers assigned to the other clusters for storing the second and successive video data are recorded in the MAT. This allows video data to be written or read out of the memory on the basis of such supervisory data. The image recording apparatus includes a CPU (Central Processing Unit) which serves as a control and designates the leading address of the first one of a series of clusters for writing a single picture of video data. After the CPU has designated the leading address of the first cluster, an address register built in the memory card sequentially increments the address until video data which can be accommodated in a single cluster has been fully written to the first cluster. A prerequisite is, therefore, that on writing one cluster of picture data, the CPU calculates the leading address of the next cluster for recording the following video data and then feeds the leading address of that cluster to the address register of the memory card. This is also true with a picture reproducing apparatus which reproduces a picture by reading video data out of a memory card.

As stated above, to write video data representative of a single picture over a plurality of clusters of a memory card or to read such data out of a plurality of clusters, it has been customary for the CPU to calculate the leading address of the next data and feed this leading address to the memory card every time the reading or writing operation is transferred from one cluster to another, i.e. every time the cluster is changed. Such a procedure to be executed by the CPU is time-consuming. Moreover, before calculating the leading address of the next cluster, the CPU has to simply wait until the memory card produces a cluster change request signal on a control bus. As a result, it is difficult for the CPU to execute other jobs during such a waiting time.

SUMMARY OF THE INVENTION

It is therefore an object of the present invention to provide a picture recording/reproducing apparatus which, in the event of reading or writing video data in a memory card or similar semiconductor memory, promotes high-speed processing associated with the cluster changing operation.

In accordance with the present invention, in a picture recording apparatus including a first storage having a plurality of storing units each of which has a predetermined capacity for accommodating video data, and writing video data in the first storage on a storing unit basis, and an inputting section receives video data to be stored in the first storage. A second storage stores in a predetermined order address data each designating, among the storing units of the first storage, a particular unoccupied storing unit. A control searches, before writing video data in the first storage, for unoccupied ones of the storing units and writes in the second storage first address data which designate storing units necessary for accommodating the video data. A data amount determining section determines the amount of video data outputted by the inputting section, and outputs, when the amount of video data matches a single storing unit of the first storage, a first signal for commanding writing of the video data to the next one of the storing units and a second signal for inhibiting the outputting operation of the inputting section. An address generating section is responsive to the first signal for reading address data representative of the next storing unit out of the second storage, generates a real address on the basis of the address data, and feeds the real address to the first storage. A selecting section selects either one of an output signal of the address generating section and an output signal of the inputting section and selectively feeds either one of the selected output signal and the address data outputted by the control to the first storage. The control writes the first address in the second storage and then feeds second address data representative of, among the storing units represented by the first address data, a storing unit to which video data should be written first to the address generating section.

Also, in accordance with the present invention, in a picture reproducing apparatus including a first storage having a plurality of storing units each of which has a predetermined capacity for accommodating video data, and reading video data out of the first storage on a storing unit basis, and an outputting section outputs video data. A second storage stores in a predetermined order address data each designating, among the storing units of the first storage, a particular occupied storing unit. A control searches, before reaching video data out of the first storage, for occupied ones of the storing units and writes in the second storage first address data which designate storing units necessary for reproducing a single unit of picture. A data amount determining section determines the amount of video data fed from the inputting section and outputs, when the amount of video data matches a single storing unit of the first storage, a first signal for commanding reading of video data from a storing unit to be read out next as designated by the first address data written to the second storage and a second signal for inhibiting the outputting operation of the outputting section. An address generating section is responsive to the first signal for generating a real address of the storing unit to be read next and feeding the real address to the first storage. A selecting section selectively transfers either one of an output signal of the control and an output signal of the address generating section to the first storage and transfers video data read out of the first storage to the outputting section. The control writes the first address data in the second storage and then feeds second address data representative of, among the storing units represented by the first address data, a storing unit from which video data should be read first to the address generating section.

BRIEF DESCRIPTION OF THE DRAWINGS

The objects and features of the present invention will become more apparent from the consideration of the following detailed description taken in conjunction with the accompanying drawings in which:

FIGS. 3A to 3D are timing charts useful for understanding the operation of the illustrative embodiment;

FIGS. 7 to 9 show various contents stored in a supervisory area particular to the embodiment;

FIG. 10 shows the contents of a MAT-RAM included in an image recording/reproducing apparatus to which the present invention is applied;

FIGS. 11 and 12 indicate how the illustrative embodiment supervises the storage of video data in a memory card;

FIGS. 16A to 16F are timing charts representative of the operation of the embodiment shown in FIG. 15.

DESCRIPTION OF THE PREFERRED EMBODIMENTS

Figure 1:
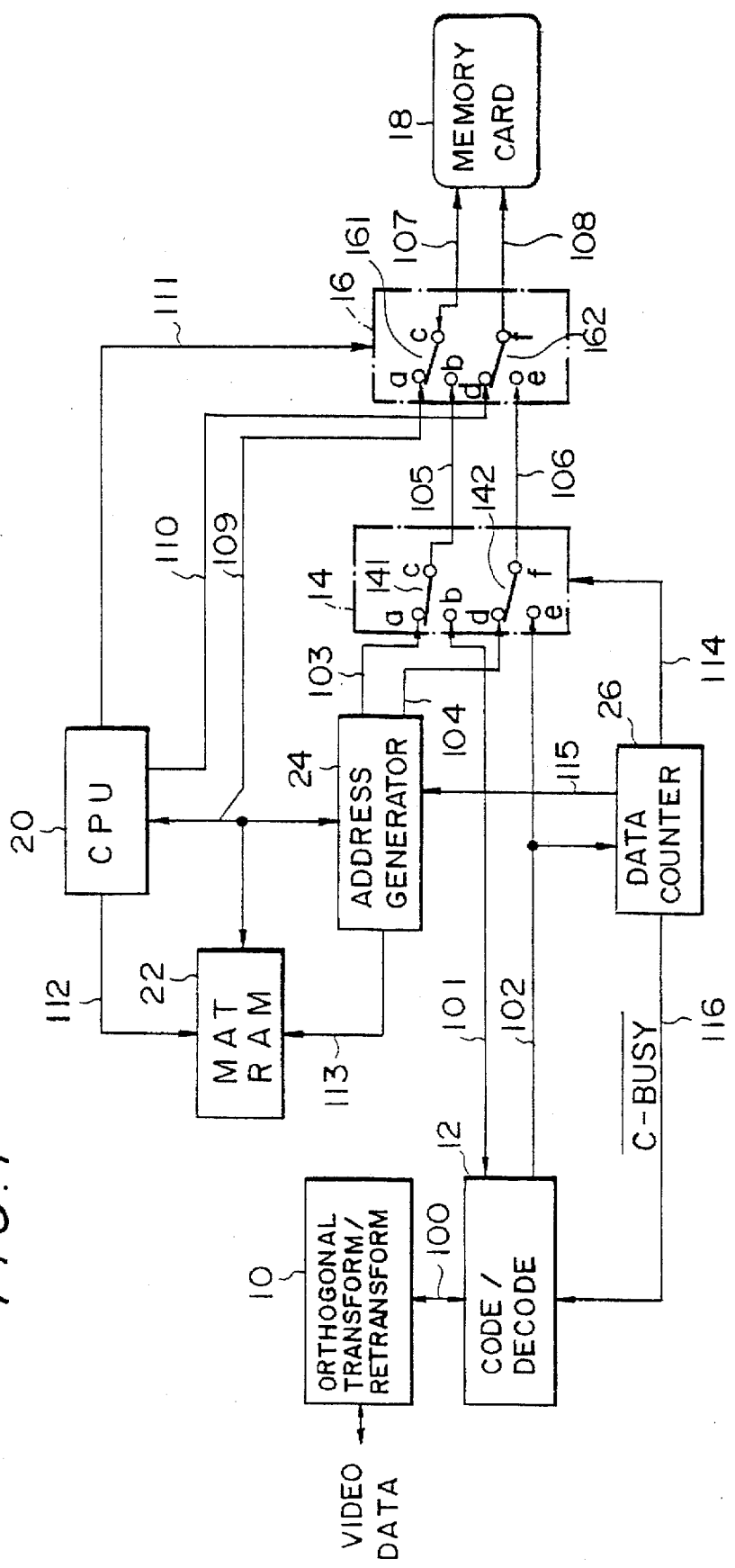
FIG. 1 is a block diagram schematically showing a picture recording/reproducing apparatus embodying the present invention.

Referring to FIG. 1 of the drawings, a picture recording/reproducing apparatus embodying the present invention is shown. As shown, the apparatus has an orthogonal transform/retransform 10 and a code/decode 12. A picture signal or video data representative of a field, for example, which has been picked up by an imaging device is compressed and thereby coded by the transform/retransform 10 and code/decode 12 in the format of digital data. The coded video data is written to a memory card 18, or video data coded by compression is read out of the memory card 18. The video data read out of the memory card 18 is expanded and thereby decoded by the code/decode 12 and orthogonal transform/retransform 10 and then fed out to the outside as a digital picture signal.

Specifically, the orthogonal transform/retransform 10 othogonally converts video data lying in the time domain into video data lying in the frequency domain or reconverts video data of the frequency domain into video data of the time domain. In the illustrative embodiment, the transform/retransform 10 divides a picture represented by video data into blocks each having a predetermined size so as to orthogonally convert or reconvert the video data block by block. The orthogonal transform may be implemented with Hadamard transform, Fourier transform, two-dimensional discrete cosine transform, or a similar conventional transforming method, while the orthogonal retransform may be implemented with the inverse procedure thereof.

The orthogonally transformed video data is fed to the code/decode 12 via a signal line 100 at a predetermined rate to be coded by compression. On the other hand, the compressed video data read out of the memory card 18 is decoded by the code/decode 12 by expansion.

The picture data outputted by the code/decode 12 is routed through selectors 14 and 16 to the memory card 18. In this embodiment, the selector 14 is constituted by two interlocked switches 141 and 142. The switches 141 and 142 have contacts a, b and c and contacts d, e and f, respectively. The contacts a and d of the switches 141 and 142 are connected to associated output terminals of an address generator 24 by an address line 103 and a control line 104, respectively. The contacts b and e are connected to the code/decode 12 by a signal line 101 and a control line 102, respectively. The selector 16, similar to the selector 14, has two switches 161 and 162 in the illustrative embodiment. The switches 161 and 162 also have contacts a, b and c and contacts d, e and f, respectively. The contact a of the switch 161 is connected to a CPU 20, a MAT-RAM 22 and the address generator 24 by a data bus 109. The contacts b and e of the switches 161 and 162 are respectively connected to the contacts c and f of the switches 141 and 142. The contact d of the switch 162 is connected to the CPU 20 by a control line 110. Further, the contacts c and f of the switches 161 and 162 are connected to the memory card 18 by a signal line 107 and a control line 108, respectively, and via a connector or a similar intermediary not shown.

A data counter 26 produces a switching signal which will be described specifically later. In the selector 14, the switches 141 and 142 have their contacts a to e selectively connected with either one of the address generator 24 and code/decode 12 by the switching signal. The selector 16 is controlled into connection with the CPU 20 or the contacts c and f of the selector 14 by a control signal which is fed thereto from the CPU 20 via a control line 111. The switches 141, 142, 181 and 162 constituting the selectors 14 and 16 each is implemented as a semiconductor switch or a similar switching device. The specific constructions of the selectors 14 and 16 shown and described are only illustrative and may be changed or modified so long as the function of switching over the connections as stated above is achievable.

Figure 5:
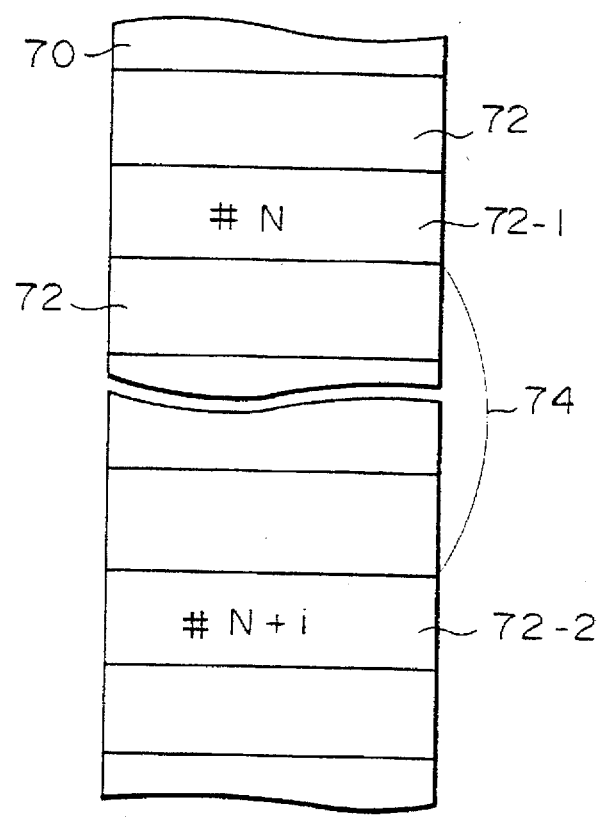
FIG. 5 shows a specific allocation of a memory area of a memory card also included in the embodiment.

The memory card 18 has a rewritable semiconductor memory and a card-like carrier which carries the semiconductor memory thereon. In this embodiment, the memory card 18 is removably connected to the picture recording/reproducing apparatus via a connector, not shown, to play the role of a temporary storage. As shown in FIG. 5 specifically, the memory card 18 has a memory area 70 which is so formatted as to have a plurality of storing units or clusters 72 each having a predetermined capacity. The capacity of each cluster 72 may be a fraction of the amount of one frame of video data divided by a natural number. In such a case, one frame of video data will be written to the memory area 70 over a plurality of clusters 72. So long as clusters 72 unoccupied by video data and sufficient in number to accommodate one frame of video data exist serially, the video data are written thereto continuously. If such unoccupied clusters are not serial with respect to the number assigned thereto, one frame of picture data are written to the unoccupied clusters by skipping intervening occupied clusters. This is also true with the read-out of video data from the memory card 18.

Figure 6:
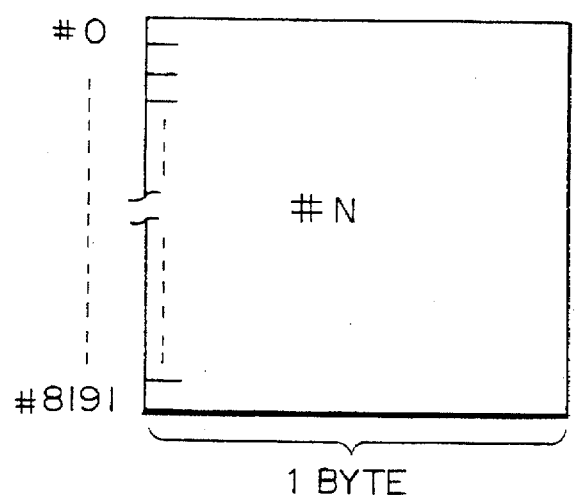
FIG. 6 shows a specific configuration of an area allocated to one of the clusters depicted in FIG. 5.

In the illustrative embodiment, each cluster 72 has a capacity of 8 kilobytes, for example. The relative addresses of the individual clusters 72 are designated by thirteen bits, for example, as will be described. As shown in FIG. 6, addresses #0 to #8191 in decimal notation are assigned to each cluster 72. FIG. 6 shows a particular cluster to be designated by #N.

The memory card 18 has, in addition to the memory area for storing video data, supervisory areas made up of a header area, packet attribute area, directory area, and a MAT (Memory Allocation Table) area. The supervisory areas may have a capacity corresponding to two clusters in total. The header area stores the number of occupied clusters, the number of unoccupied clusters, and other similar data. The packet attribute area stores a table that indicates whether packets are occupied or unoccupied, packet by packet. The word "packet" refers to a single group or unit of clusters for storing video data representative of a single picture.

Figure 11:
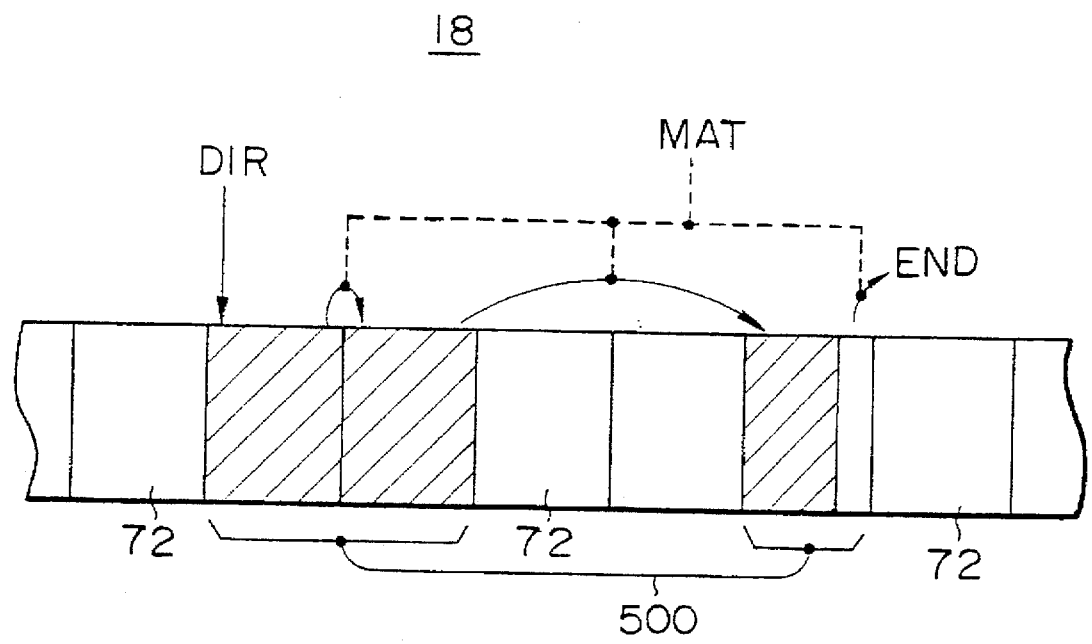

How data is recorded in the memory card 18 will be described briefly. As shown in FIG. 11, the recording area 70 of the memory card 18 is divided into a predetermined number of uniform clusters 72. Data representative of one picture (packet 500) is recorded in, among the clusters 72, a plurality of particular clusters 72 selected, as shown FIG. 6 specifically. The particular clusters 72 constituting the packet 500 may be or may not be serial, where FIG. 6 indicates the latter case. When video data representative of another picture is to be recorded in the memory card 18, a required number of clusters 72 other than the occupied clusters 72 are selected to constitute a packet 500.

With the above-stated method that selects a particular number of clusters matching the amount of video data and recording the video data therein, a prerequisite is that the numbers of the clusters loaded with video data be memorized packet by packet to allow the video data to be searched for and read out in the future. To meet this requirement, a part of the memory area that corresponds to the first cluster 72 is used as the supervisory areas. Specifically, as shown in FIG. 12, the header area, packet area, directory area and MAT area are defined in the first cluster 72 of the memory. The start clusters of the individual packets or video data, i.e., the numbers assigned to the first clusters of the individual packets loaded with video data are stored in the directory area. The MAT area stores the numbers assigned to unoccupied clusters each of which will be occupied after the immediately preceding one. These supervisory data facilitate the read-out of video data. More specifically, the apparatus reads a sequence of video data (packet) out of the memory card 18 by reading the number assigned to the first one of the clusters storing the data sequence out of the directory area, and then sequentially reading the numbers assigned to the clusters that follow the first cluster out of the MAT area.

Figure 7:
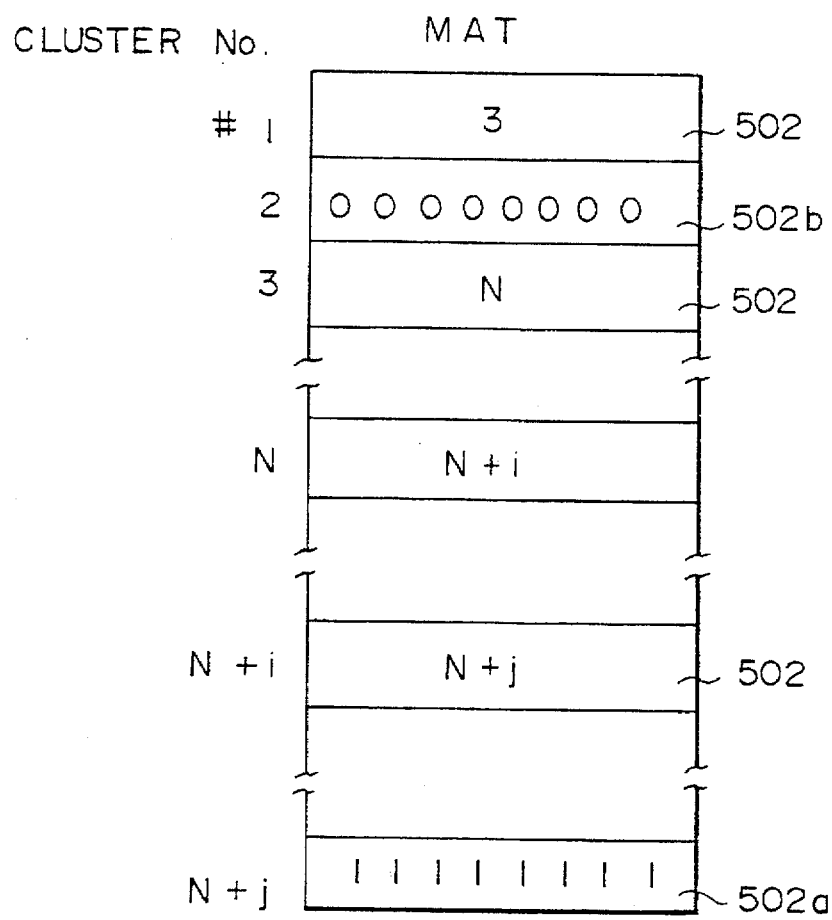

As shown in FIG. 7, the MAT area of the memory card 18 has subareas 502 to which serial numbers (#1, #,2 ... N ..) corresponding to the cluster numbers are assigned. Each subarea 502 associated with a particular cluster number stores the cluster number for reading or writing video data next. In the example shown in FIG. 7, the CPU 20 recognizes that a picture is to be recorded or reproduced by seqentially reading or writing video data in the clusters #1, #N, #N+i and N+j in this order, by referencing the MAT. In a subarea 502a corresponding to the cluster number that indicates the last one of the group of clusters storing a single picture (e.g. a picture represented by one frame of video data), data having an unusual value such as 8-bit all ONE data ("11111111") is stored. On the other hand, in subarea 502b corresponding to the cluster numbers indicative of unoccupied clusters, 8-bit all ZERO data ("00000000") is stored.

As shown in FIG. 8, the directory area of the memory card 18 has subareas each being assigned to respective one of packet numbers Px (x=0, 1, 2 ... i, i+j). Each of these subareas stores the number of a cluster of a packet from or to which data should be read or written first, and the kind of the data (e.g. whether the data is video data or audio data).

As shown in FIG. 9, the packet attribute area has subareas each being associated with a respective one of the packet Nos. Px (x=0, 1, 2 ... i, i+1, ... ). These subareas each store data indicating whether a packet associated therewith is occupied or unoccupied. In the figure, circles and crosses are representative of occupied packets and unoccupied packets, respectively.

In a record mode for writing video data in the memory card 18, the CPU 20 searches for unoccupied clusters 72 by referencing the MAT of the memory card 18 before starting on an actual writing operation. To read video data out of the memory card 18, the CPU 20 searches for occupied clusters storing the video data of interest by referencing the MAT before an actual reading operation. The CPU 20 writes the numbers of the occupied or unoccupied clusters found by the search to the MAT-RAM 22 which stores the MAT.

Further, the CPU 20 controls the transform of video data being performed by the orthogonal transform/retransform 10 and the compression/expansion of video data being performed by the code/decode 12, while controlling the switching operations of the selector 16.

As shown in FIG. 10, the MAT-RAM 22 sequentially memorizes, under the control of the CPU 20, the numbers (Nos.) assigned to the clusters 72 of the memory card 18 from or in which video data should be read or written.

Figure 4:
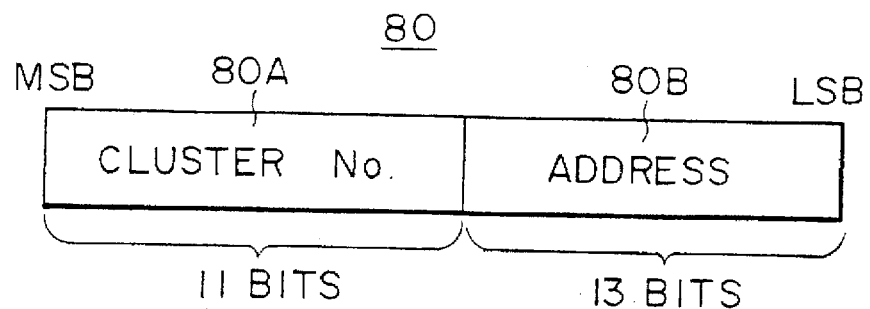
FIG. 4 shows a specific format of a real address of a cluster generated by an address generator which is included in the illustrative embodiment.

The address generator 24 reads a cluster number out of the MAT-RAM 22 via the data bus 109, generates the real address of a cluster having the read cluster number, and delivers the real address over the address line 103. More specifically, as shown in FIG. 4, the real address generated by the address generator 24 is made up of address data 80A representative of the cluster number read out of the MAT-RAM 22, and a relative address 80B Within the cluster of interest. The real address 80 has twenty-four bits, for example, and allocate the upper eleven bits to the cluster number and the lower thirteen bits to the relative address. In this embodiment, data and address are fed from the memory card 18 over a single bus, i.e., by a so-called I/O (Input/Output) bus system. The address generator 24 transfers an address to the memory card 18 via the address line 103 and signal line 105, while the CPU 20 delivers data to the memory card 18 via the data bus 109.

The address generator 24 feeds a control signal to the MAT-RAM 22 via the control line 113 for controlling the data read timing and other similar timings. At the same time, the address generator 24 delivers various kinds of control signals associated with data reading and writing to the memory card 18 via the control line 104.

The previously mentioned data counter 26 counts video data having been coded or decoded by the code/decode 12. Every time the data counter 26 counts one cluster of video data, the data counter 26 renders a control signal C-BUSY coupled to the code/decode 12 via the control line 116 significant for interrupting the input and output operations of the code/decode 12. At the same time, the data counter 26 feeds a cluster switch request signal to the address generator 24 via the control line 115 so as to transfer the reading or writing operation to the next cluster. Further, the data counter 26 feeds a control signal or switching signal to the selector 14 via the control line 114 for controlling the selector 14 in the event of the cluster switching. In practice, the data counter 26 counts the picture data in terms of the number of times that the code/decode 12 feeds a read signal or write signal to the memory card 18. This stems from the fact that a read signed or a write signal is outputted every time an address appears on a signal line on a byte basis, i.e., the number of times that such a signal is outputted accurately represents the amount of data.

Figure 2A:
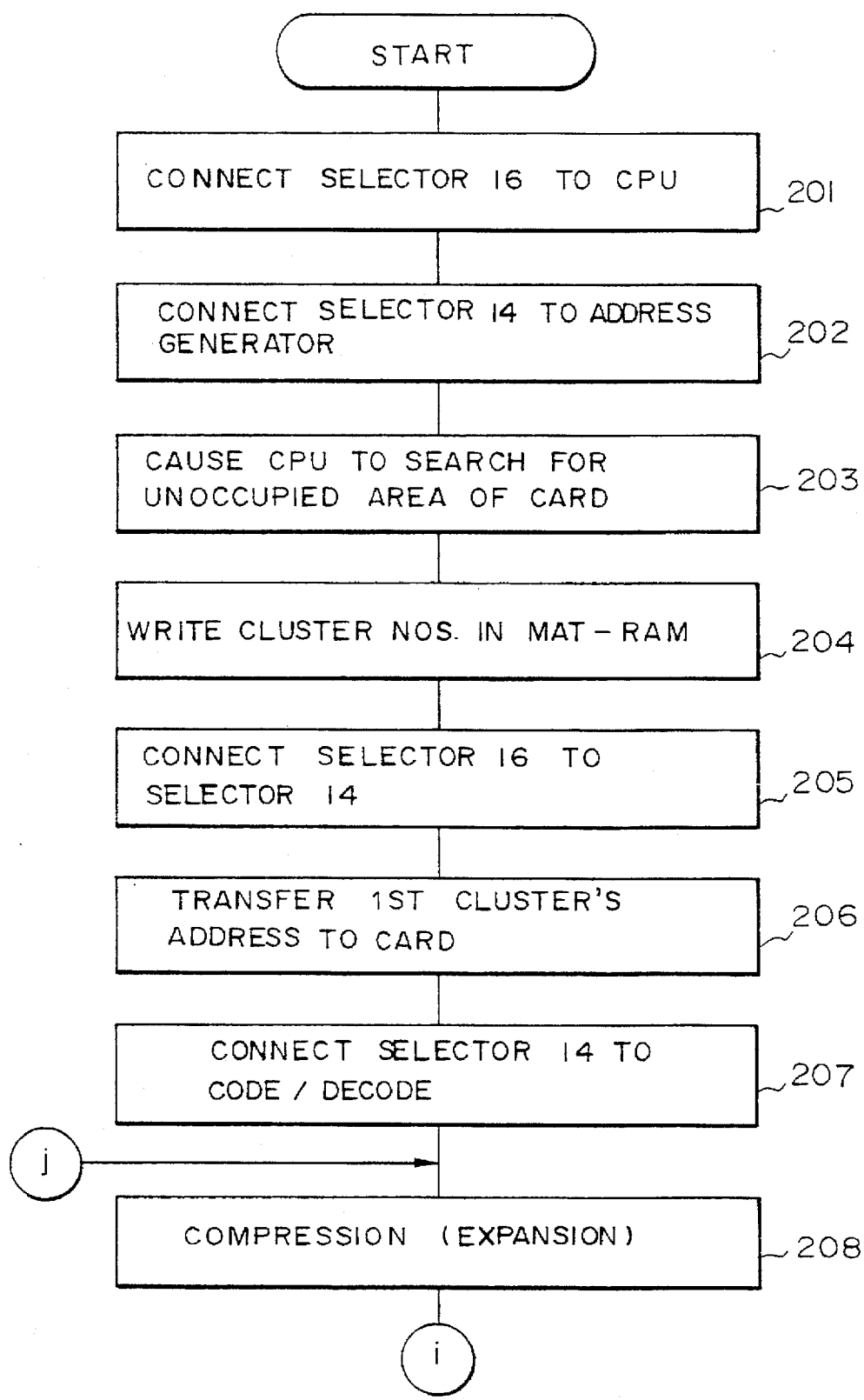
FIGS. 2A and 2B are flowcharts demonstrating a specific operation of the apparatus shown in FIG. 1.
Figure 2B:
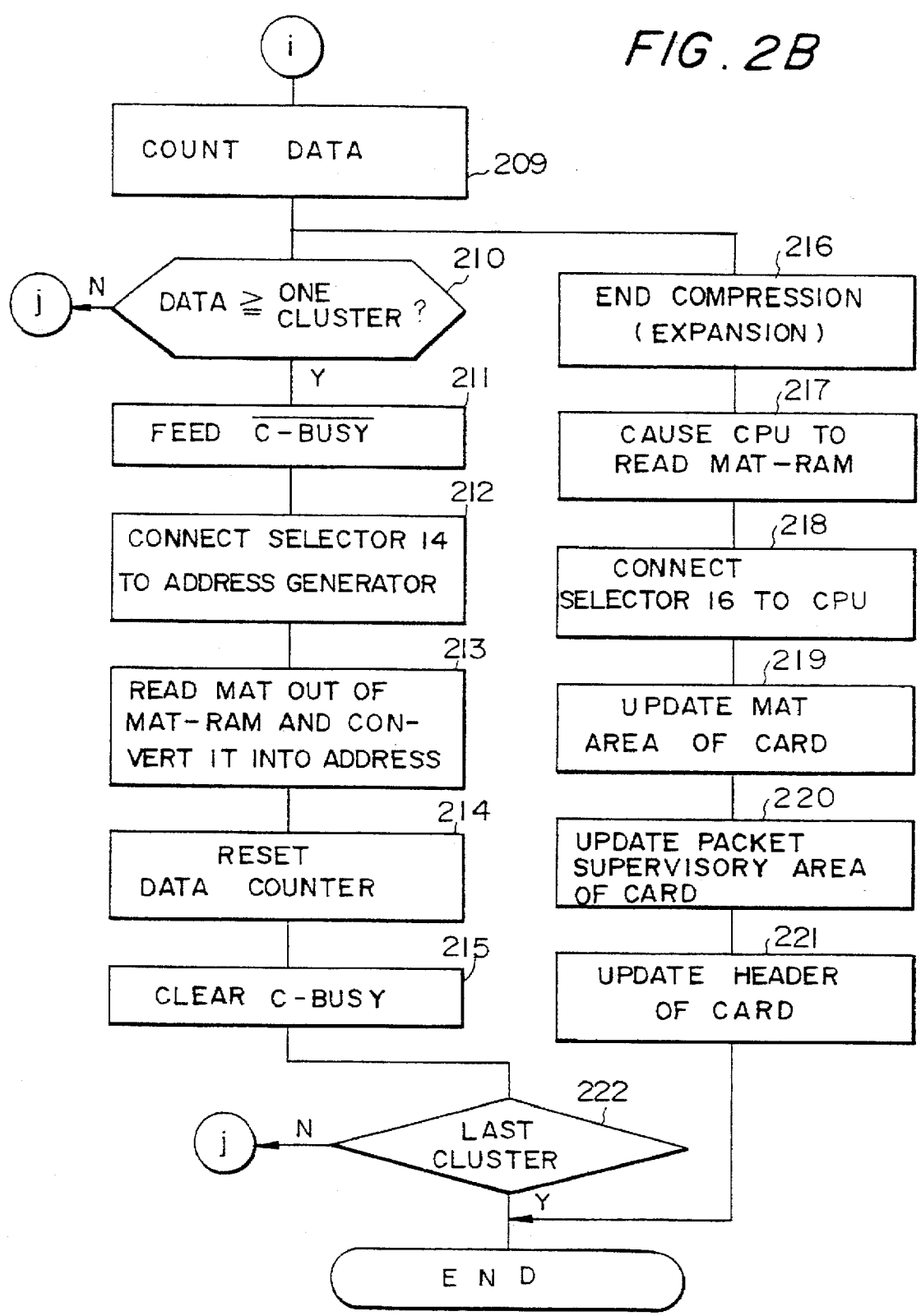

The operation of the picture recording/reproducing apparatus shown in FIG. 1 will be described with reference to flow charts shown in FIGS. 2A and 2B and a timing chart shown in FIG. 3. The operation begins with a step 201 in which the CPU 20 feeds a switching signal to the selector 16 via the control line 111 to cause it into connection with the CPU 20, as shown in FIG. 1. Then, the data counter 26 delivers a switching signal to the selector 14 via the control line 114 to bring it into connection with the address generator 24, as shown in FIG. 1 (step 202). The CPU 20 references the supervisory areas of the memory card 18 to search for unoccupied clusters for writing video data therein or occupied clusters for reading video data thereoutof. Then, the CPU 20 writes data representative of the numbers assigned to a required number of clusters in the MAT-RAM 22, while writing the number assigned to the first cluster of the packet of interest in the RAM area of the CPU 20 (steps 203 and 204). The words "required number of clusters" mentioned above refer to, for example, the number of clusters matching a desired picture quality mode in the case of data writing. After writing such cluster numbers in the MAT-RAM 22, the CPU 20 delivers a switching signal to the selector 16 via the control line 111. As a result, both of the switches 161 and 162 constituting the selector 16 are caused into connection with the selector 14 via the contacts b and e thereof (step 205).

Subsequently, the CPU 20 delivers data representative of the number of the first cluster of the packet to be written or read out of the memory card 18 to the address generator 24 via the data bus 109. In response, the address generator 24 generates the real address of the cluster of interest on the basis of the address data representative of the cluster number and the leading address (relative address) of that cluster. The real address is routed through the address line 103, selector 14, signal line 105, selector 16 and signal line 107 to the memory card 18 and set in an address register which is built in the memory card 18 (step 206).

In the subsequent step 207, the data counter 26 delivers a switching signal to the selector 14 for causing it into connection with the code/decode 12 via the contacts b and e thereof. In a record mode, the code/decode 12 receives orthogonally transformed video data from the orthogonal transform/retransform 10 and compresses and thereby codes the video data under the control of the CPU 20 (step 208). On the other hand, in a playback mode, the code/decode 12 expands and thereby decodes video data read out of the memory card 18. The decoded video data is orthogonally retransformed by the transform/retransform 10.

The coded video data from the code/decode 12 is fed to the memory card 18 via the selectors 14 and 16. The memory card 18 has already stored in the address register thereof the leading address (real address) of the cluster which should be written first, step 206. Therefore, every time coded video data arrives at the memory card 18, the address register increments the leading address with the result that the successive video data are sequentially written to consecutive memory locations. Such a sequence of steps for designating the address of a cluster is also effected in the event of reading video data out of the memory card 18.

The data counter 26 counts the number of times that the code/decode 12 outputs a write signal or a read signal (FIG. 3A) on the control line 102, for thereby determining the amount of data (step 109). When the data does not amount to one cluster as determined by the data counter 26 in the step 109, the program returns to the step 208 for repeating the above-described sequence of steps (step 210).

Assume that the data counter 26 has counted one cluster of data, i.e., one cluster of data has been written to or read out of the memory card 18, as determined in the step 210. Then, the data counter 26 renders the signal C-BUSY fed to the code/decode 12 via the control line 116 significant at a time t0, FIG. 3D (step 211). Further, the data counter 26 delivers a switching signal to the selector 14 via the control line 114 to connect the selector 14 to the address generator 24 via the contacts c and d. At the same time, the data counter 26 feeds a cluster change request signal to the address generator 24 via the control line 115 at a time t1, FIG. 3C (step 212).

In response to the cluster change request signal, the address generator 24 feeds to the MAT-RAM 22 via the signal line 113 a control signal for reading out the number of the next cluster included in the packet of interest. As a result, a given cluster number is read out. Specifically, assuming that the number of the first cluster in or from which data was written or read is No. 1 as shown in FIG. 10, then the cluster No. 3 is read out of the MAT-RAM 22. The address generator 24 generates the leading address (real address) of the cluster No. 3 and feeds the leading address to the memory card 18 via the selectors 14 and 16, whereby the leading address is set in the address register of the memory card 18 (step 213). FIG. 3B presents a specific sequence wherein if video data D (1) to be written to the cluster No. 1 or video data read thereoutof is outputted on the signal line 107, then the 24-bit leading address A (0–7) 3, A(8–15) 3, A(16–23) 3 of the cluster No. 3 is fed, and then video data D (3) to be written to or read out of the cluster No. 3 is outputted.

After the address generator 24 has delivered the leading address of the next cluster to the memory card 18, the data counter 26 is reset at a time t2 and in turn renders the control signal C-BUSY fed to the code/decode 12 insignificant (steps 214 and 215). This is followed by a step 222 for determining whether or not video data has been written to or read out of the last cluster. If the answer of the step 222 is Yes, this processing sequence ends. If the answer of the step 222 is No, the program returns to the step 208. It is to be noted that the CPU 20 joins in the steps 201 to 206 while functioning sections (hardware) other than the CPU 20 join in the steps 207 to 216 and the step 222. In the steps 207 to 216 and the step 222, the CPU 20 executes other jobs including the steps 217 to 221.

When one packet of video data is fully coded or decoded by the code/decode 12 under the control out of the CPU 20, an end signal is fed from the code/decode 12 to the data counter 26 via the control line 102 for informing the data counter 26 of the end of data compression or expansion (step 216).

The CPU 20 reads data out of the MAT-RAM 22 while switching the selector 16 into connection with the CPU 20 via the contacts a and d (steps 217 and 218). At this time, since the conditions of the individual clusters of the memory card 18 are different from previous ones, the CPU 20 updates the supervisory areas of the memory card 18, i.e., MAT area, packet supervising area (attribute area and directory area), and header area after writing all the video data and then ends this processing sequence (steps 219, 220 and 221). The steps 217 to 221 will be omitted in the event of reading video data out of the memory card 18, since the conditions of the individual clusters of the memory card 18 do not change at the time of read-out.

While the illustrative embodiment has been shown and described as reading or writing data representative of a single picture in the memory card 18 at a time, it is also capable of recording data representative of a plurality of pictures continuously in the memory card 18. Specifically, unoccupied clusters ready to store a series of pictures are searched for in the memory card 18, and their numbers are collectively written to the MAT-RAM 22. Then, the processing sequence stated previously is executed with one picture (one packet). Thereafter, the cluster number assigned to the first one of the clusters constituting the next picture is fed to the address generator 24. This is followed by the previously stated operation for writing data representative of one picture. The number assigned to the first cluster of each picture may be written to the RAM area of the CPU 20 beforehand and fed to the address generator 24 one after another. Alternatively, such cluster numbers may be fed from the MAT-RAM 22 to the address generator 24, if desired. To read data representative of a plurality of pictures continuously out of the memory card 18, the addresses of the individual clusters will be designated in exactly the same manner as in the writing procedure.

The I/O bus system shown and described is only illustrative and may be replaced with a direct bus system which transfers data and addresses by the use of independent buses. To implement the direct bus system, an address counter will be built in the memory card 18 in addition to the construction shown in FIG. 1. Although the foregoing description has concentrated on the condition in which video data is coded by compression before the video data is written to the memory card 18, the embodiments of the present invention are practicable even when the video data to be recorded do not undergo compression coding.

As stated above, the illustrative embodiment assigns the function of changing the clusters during the course of reading or writing video data to hardware other than a CPU. This allows the CPU to execute other jobs while a data compressing or expanding procedure is under way, for thereby enhancing high-speed CPU processing. A MAT-RAM included in the embodiment makes it not always necessary to use the RAM area of the CPU in temporarily storing cluster numbers.

A MAT area, packet supervising area and a header are sequentially written to a memory card in this order together with video data. Hence, even when an accident such as the inadvertent removal of a memory card or when the power source goes down, has occurred during the course of recording operation, it is not likely that an incomplete picture is recorded in the memory card 18.

In summary, in the illustrative embodiment, a CPU playing the role of a controller searches for particular storing units or clusters of a memory card or a similar storage device in or from which video data should be written or read, stores the numbers assigned to those clusters to another storage device, and then changes the cluster by hardware. This promotes rapid switchover of clusters and, in addition, allows the CPU to execute other jobs while video data is compressed or expanded by a coding/decoding section.

In the embodiment described above, even when all the numbers assigned to the unoccupied clusters of the memory card 18 which are ready to record video data are continuous, the cluster is changed over every time the procedure for writing video data is transferred from one cluster to the next cluster. This is also true with the read-out of video data stored in a plurality of clusters of the memory card 18.

By contrast, an alternative embodiment of the present invention which will be described causes the CPU 20 to omit the cluster changing operation when a continuous series of occupied or unoccupied clusters is available in the memory card 18. To omit the cluster switching operation, the CPU 20 delivers a control signal (disenable signal) to the address generator 24 and data counter 26 via the control lines 117 and 118, respectively, in order to inhibit the address generator 24 and data counter 26 from operating.

Figure 13:
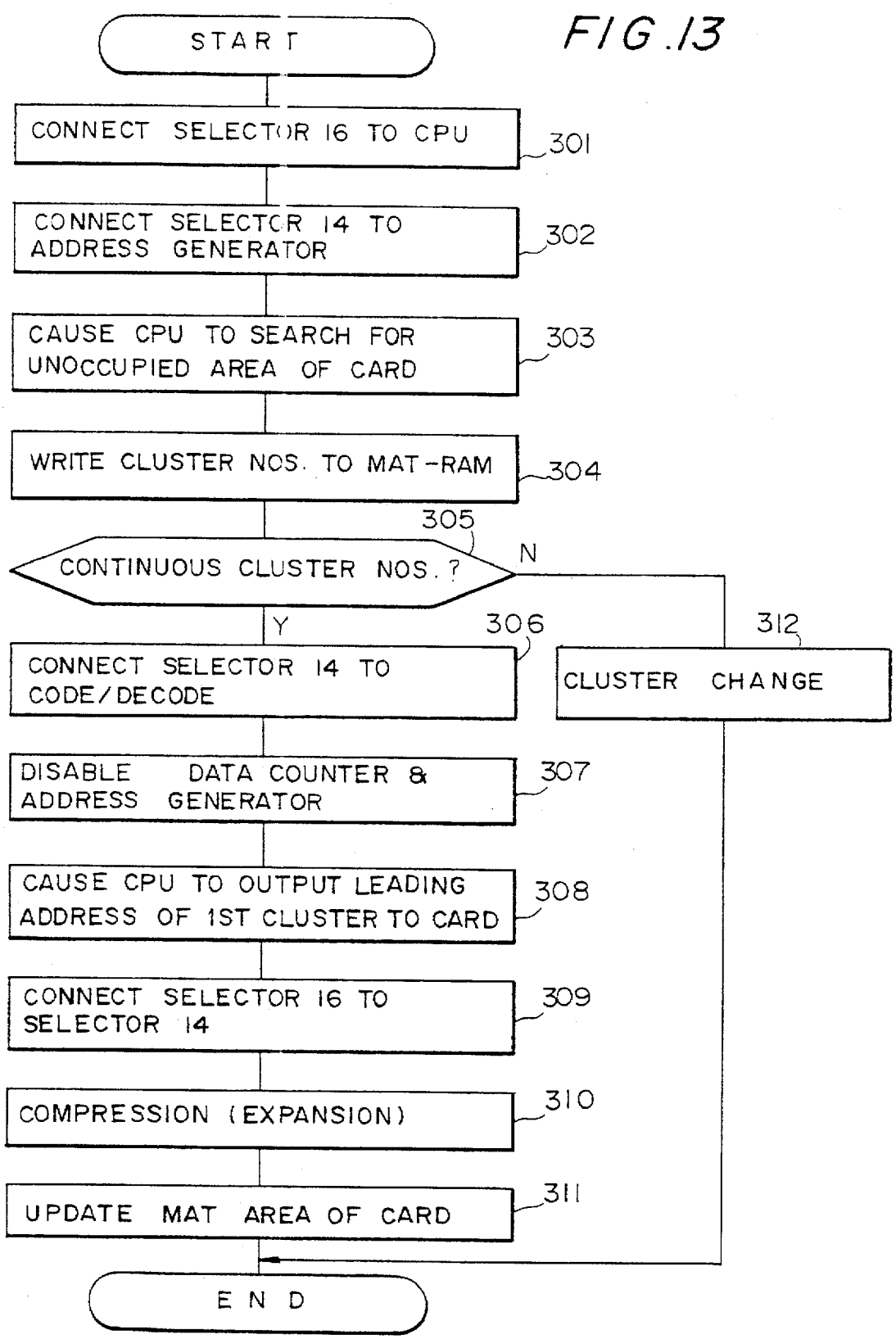
FIG. 13 is a flowchart demonstrating a sequence of steps particular to an alternative embodiment of the present invention.

Reference will be made to FIG. 13 for describing the operation of the alternative embodiment in detail. As shown, the CPU 20 feeds a switching signal to the selector 16 via the control line 111 to cause it into connection with the CPU 20 (step 301). Then, the data counter 26 delivers a switching signal to the selector 14 via the control line 114 to bring it into connection with the address generator 24, as shown in FIG. 1. The CPU 20 references the supervisory areas of the memory card 18 to find unoccupied clusters for writing video data or occupied clusters for reading data (step 303). Subsequently, the CPU 20 writes data representative of the numbers assigned to a required number of clusters in the MAT-RAM 22 while writing the cluster number of the first one of the clusters of the packet of interest in the RAM area of the CPU 20 (step 304).

After the step 304, a step 305 is executed for determining whether or not all the numbers assigned to a plurality of (e.g. N) unoccupied clusters (occupied clusters in the event of read-out) and stored in the MAT-RAM 22 are continuous. If the answer of the step 305 is No, the cluster changing operation, i.e., the steps 205 to 222 of FIGS. 2A to 2B are executed (step 312).

Figure 14A:
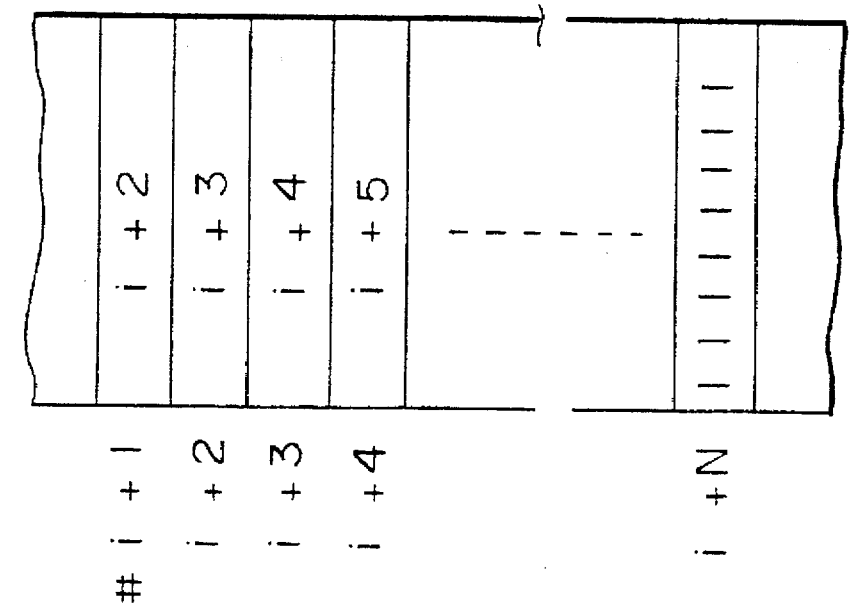
FIGS. 14A and 14B show other specific contents of the MAT-RAM.

Assume that all the numbers of the N unoccupied clusters written in the MAT-RAM 22 are continuous, as shown in FIG. 14A. Then, the data counter 28 feeds a switching signal to the selector 14 for causing it into connection with the code/decode 12 via the contacts b and e (step 206). Subsequently, the CPU 20 delivers a disenable signal to the data counter 26 and address generator 24 via the control lines 117 and 118, respectively, for thereby inhibiting the data counter 26 and address generator 24 from operating (step 307). The CPU 20 calculates the leading address (real address) of the first one of the clusters of the memory card 18 that constitute the packet of interest on the basis of the number of the first cluster which has been stored in the RAM area of the CPU 20. The calculated leading address is applied to the memory card 18 via the data bus 109 and selector 16 (step 308). Thereafter, the CPU 20 feeds a switching signal to the selector 16 via the control line 111 to connect it to the selector 14 (step 309).

Subsequently, the code/decode 12 executes compression (or expansion) of video data for all the clusters (N clusters in the embodiment) (step 310). Assuming that compressed video data is to be written to the memory card 18, the CPU 20 sets the leading address of the first cluster in the address register of the memory card 18. Then, every time a predetermined amount of video data (one byte of video data in the embodiment) is written to the memory card 18, the leading address of the first cluster is automatically incremented (step 307). The cluster changing operation based on the outputs of the data counter 26 and address generator 24 does not occur until video data has been fully written to the N clusters. This is also true with the case wherein video data should be read out of the memory card 18.

Figure 14B:
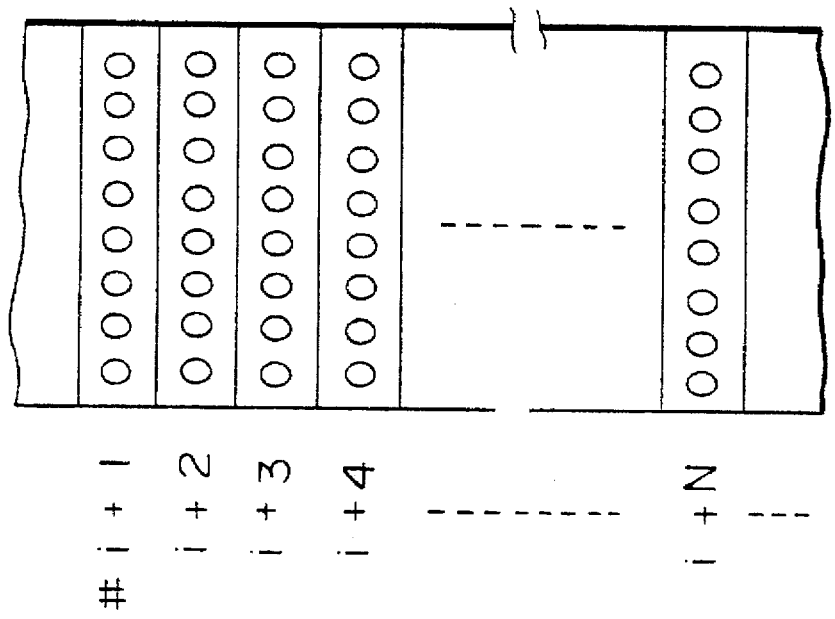

When the compression (expansion) of video data is completed, the CPU 20 updates the MAT area of the memory card 18 (step 311). It is only when video data is to be written to the memory card 18 that the MAT area is updated as mentioned above. Specifically, as shown in FIG. 14B, every time the address of the MAT area is incremented by an address counter built in the memory card 18, the CPU 20 updates the MAT area by incrementing the cluster number by 1 (one), starting from the cluster number of the first cluster (#i+1 in the embodiment). Hence, when a plurality of unoccupied clusters are continuous with respect to the cluster number, the CPU 20 does not have to determine the number of a cluster every time video data is written to the memory card 18. As a result the load on the CPU 20 is successfully reduced.

In summary, in this particular embodiment, when all the plurality of clusters of the memory card or a similar store device 18 for reading or writing video data are continuous with respect to the cluster number, the CPU 20 designates the leading address of the first cluster and, thereafter, stops the operations of the address generator 24 and data counter 26 while causing the address register of the memory card 18 to sequentially increment the leading address. This eliminates the need for the cluster changing operation which would be executed if the clusters were not continuous, for thereby speeding up the writing and reading operations.

In the embodiments described above, when new video data, for example, is to be written to a memory, the number of clusters which should be assigned to the video data is determined, then whether or not unoccupied clusters available in the memory have a total capacity great enough to accommodate the video data is determined, and then the video data are written to the memory. Assume that a code/decode section has outputted video data having a length greater than a predetermined data length due to some error which has occurred in the processing for compressing the video data or the pocessing for fixing the data length. Then, such data, i.e., data exceeding the total capacity of the unoccupied clusters is fed to the memory and is apt to destroy necessary data stored in the memory. Regarding audio data whose length is not always constant, it is necessary to trim the data off at a predetermined length.

Another alternative embodiment which will be described hereinafter is implemented as an audio and video data recording apparatus which trims off data to be recorded at a predetermined length. This prevents data exceeding a predetermined length due to the above-mentioned error from affecting data which are stored in the other areas of a memory.

Figure 15:
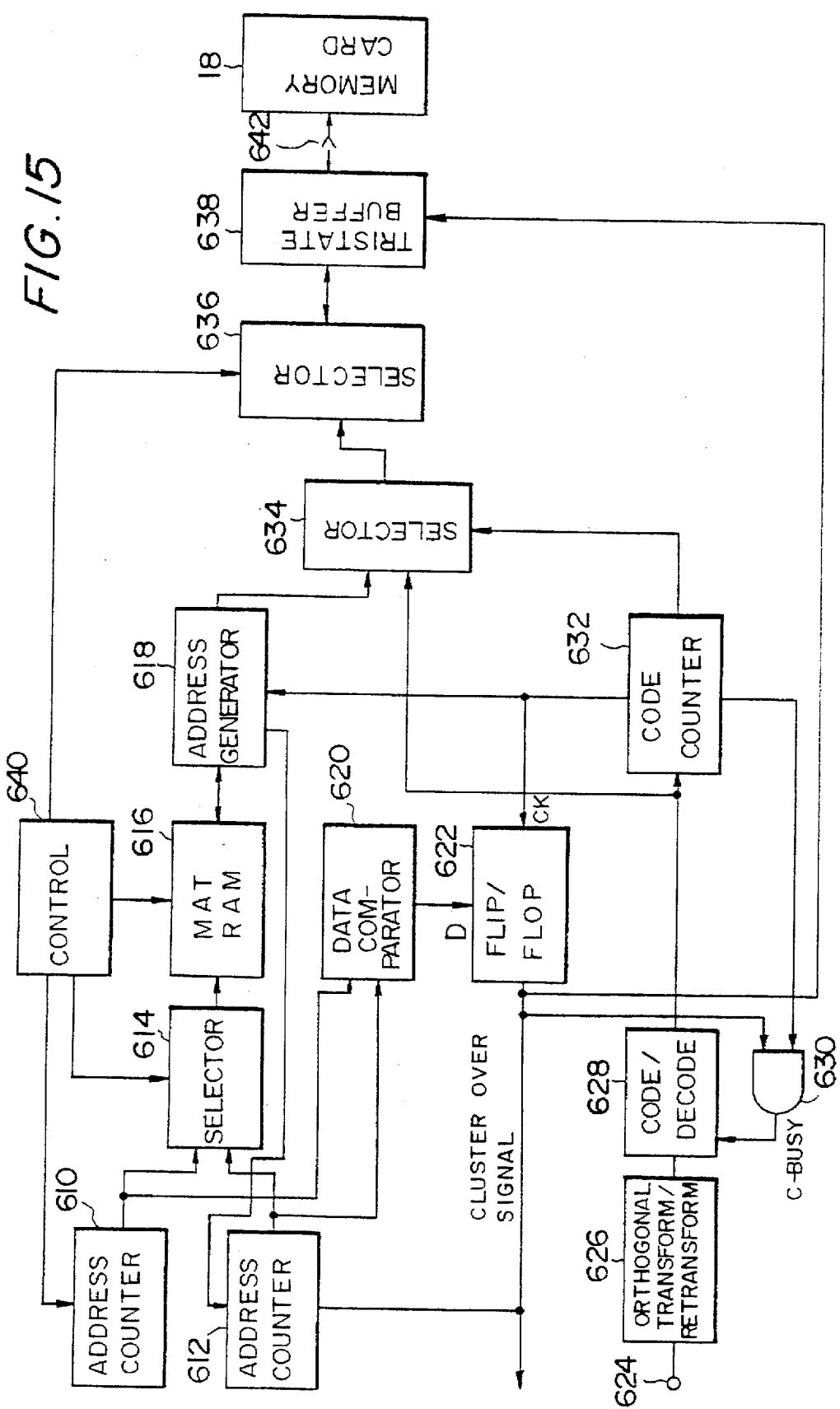
FIG. 15 is a block diagram showing a compression type video data recording apparatus representative of another alternative embodiment of the present invention.

As shown in FIG. 15, the audio and video data recording apparatus has an orthogonal transform 626 and a code/decode 628. While this embodiment will be described as dealing with video data, it is practicable in the same manner with audio data. The orthogonal transform 626 receives video data outputted by an electronic still camera, for example, and subjects the video data to two-dimensional cosine transform or a similar orthogonal transform. The, transformed video data is fed from the transform 626 to the code/decode 628. In response, code/decode 628 codes the video data by Huffman coding or similar coding principle. The output of the code/decode 628 is applied to one input terminal of a selector 634 and a code counter 632.

An address generator 618 feeds the address of a cluster, which will be described, to another input terminal of the selector 634. The coded video data from the code/decode 628 is transferred to another another input terminal of the selector 634. The selctor 634 selects either one of the coded video data from the code/decode 628 and the cluster address from the address generator 618. Specifically, the code/decode counter 623 counts video data being outputted by the code 628 and, on counting a predetermined amount of data that can be recorded in a cluster, delivers a cluster change request signal to the address generator 618, a flip-flop 622, and the selector 634.

A MAT-RAM 616 stores the numbers assigned to the individual clusters of the memory card 18 which are reserved for writing video data. Specifically, to record video data, a control 640 searches for unoccupied clusters in the memory card 18, determines the order in which the video data should be written to the unoccupied clusters, and then writes the numbers of such clusters to the MAT-RAM 616. The output of the MAT-RAM 616 is transferred to the address generator 618. In response, the address generator 618 generates 24-bit address data having the upper eleven bits representative of a cluster number fed thereto from the MAT-RAM 616 and the lower thirteen bits which are all ZEROs. This 24-bit address data designates the leading address of the cluster and serves as a real address of the cluster when video data is to be written to the memory card 18.

The illustrative embodiment has two additional address counters 610 and 612. The address counter 610 counts the clusters which the control 640 stores in the MAT-RAM. 616 in the event of writing video data. The address counter 612 counts the addresses, or clusters, which are sequentially read out of the address generator 618 when video data should be written to the memory card 18. The outputs of the address counters 610 and 612 are fed to a selector 614. The selector 614 selects either one of the outputs of the address counters 610 and 612 and feeds the selected output to the MAT-RAM 616. Specifically, the selector 614 selects the output of the address counter 610 during preprocessing and the output of the address counter 611 during picture recording.

The outputs of the address counter 610 and 612 are also transferred to a data comparator 620. The data comparator 620 compare the outputs of the address counters 610 and 612 and, if they are equal, produces a coincidence signal. The coincidence signal appears when video data has been written to the given number of clusters. The flip-flop 622 receives the output of the data comparator 620 and the cluster change request signal from the code counter 632 at a D terminal and a CK (clock) terminal, respectively. On receiving the cluster change request signal from the code counter 632 and the coincidence signal from the data comparator 620, the flip-flop 622 outputs a cluster over signal. The coincidence signal indicates that video data has been fully written to the given number of clusters, while the cluster change request signal indicates that the address of the next cluster is ready to be outputted.

The cluster over signal from the flip-flop 622 is applied to one input of an AND gate 630. Applied to the other input of the AND gate 630 is the cluster change request signal from the code counter 632. When both the cluster over signal and the cluster switch request signal are significant, the AND gate 630 produces the signal C-BUSY. More specifically, the AND gate 630 interrupts the output of the code/decode 628 by the signal C-BUSY when the given number of clusters have been filled as indicated by the cluster over signal and, in addition, video data is about to be written to the next cluster. Usually, the signal C-BUSY goes low when video data has been fully recorded and again goes high in the above-mentioned AND condition.

The cluster over signal from the flip-flop 622 is also fed to a tristate buffer 638 which stores the address and video data to be recorded in the memory card 18 and selectively assumes a state for stopping the output of such data. Specifically, the tristate buffer 638 stops the output of data to the memory card 18 in response to the cluster over signal from the flip-flop 622. The memory card 18 is removably connected to the tristate buffer 638 via a connector 642. The memory card 18 has a semiconductor memory which is divided into a predetermined number of clusters, as stated earlier.

When coded video data is to be recorded in the memory card 18 by the above-stated recording system, this particular embodiment prevents video data having exceeded the capacity of a given number of clusters due to an error which has occurred in the code/decode 628 or a similar section from being recorded in the memory card 18.

The control 640 controls the various sections included in the recording apparatus. Particularly, to record video data in a plurality of clusters of the memory card 18, the control 640 searchs for unoccupied clusters, selects clusters for recording out of the unoccupied clusters, and writes the numbers assigned to the selected clusters in the MAT-RAM 616.

Reference will be made to FIGS. 16A to 16F for describing the operation of the illustrative embodiment. As shown, the control 640 determines the required number of clusters on the basis of the amount of compressed data to be recorded. Then, the control 640 reads video data already stored in the memory card 18 via the connector 642 and tristate buffer 638 to see which of the clusters of the memory card 18 are unoccupied. The control 640 determines whether or not the compressed video data can be fully recorded in the unoccupied clusters and, if the answer is positive, designates particular ones of the unoccupied clusters for recording the video data. Thereupon, the control 640 feeds the numbers assigned to such particular clusters to the address counter 610 and switches the selector 614 into connection with the address counter 610.

The address counter 610 counts the numbers of the clusters transferred from the control 640 while delivering the output thereof to the MAT-RAM 616 via the selector 614. The MAT-RAM 616 sequentially memorizes the numbers of the clusters which will be used. On receiving the number of the last cluster from the control 640, the address counter 610 stops counting and holds that number therein. In the illustrative embodiment, the count finally held in the address counter 610 is N since video data is assumed to be recorded in N clusters.

After outputting all of the cluster numbers, the control 640 feeds a control signal to the MAT-RAM 616 to cause the MAT-RAM 616 to start outputting the cluster numbers, i.e., 11-bit addresses one by one. Each of the 11-bit addresses each is fed to the address generator 618. In response, the address generator 618 adds lower thirteen bits which are all ZEROs to the eleven bits, or upper bits, and delivers the resulting twenty-four bets to the selector 634 as a read address indicative of the leading address of the associated cluster.

As the code counter 632 causes the selector 634 into connection with the address generator 618 by a control signal, the cluster change request signal from the code counter 632 is routed to the address generator 618. Then, the address generator 618 feeds the address of the first cluster to the selector 634. This address is routed through the selectors 634 and 636, tristate buffer 638 and connector 642 to the memory card 18 to designate the address representative of a cluster of interest included in the memory card 18. The address is also transferred to the address counter 612.

Subsequently, the code counter 632 delivers a control signal to the selector 634 to switch it into connection with the code/decode 628. In this condition, compressed video data from the code 628 are sequentially fed to the memory card 18 via the selector 634 to be recorded in the particular cluster having been designated by the address. As the selector 634 is repetitively switched over as stated above, the leading addresses of the individual clusters and the compressed video data are transferred to the memory card 18 cluster by cluster, as shown in FIGS. 16A to 16F. As these figures indicate, the leading address of each cluster has 8-bit lower, intermediate and upper addresses which are transferred to the memory card 18 in response to a R/W (Read/Write) signal fed from the control 640. The step of feeding an address to the memory card 18 and recording compressed video data therein is repeated. The addresses of the individual clusters are also fed from the address generator 618 to the address counter 612 to be counted thereby.

When compressed video data has been fully written to the given number of clusters, i.e., N clusters by the above repetitive procedure, the usual recording operation is completed. Every time the address generator generates the leading address of each of the N clusters, the address is also applied to the address counter 612 and counted thereby. Hence, when the address of the N-th cluster is outputted, i.e., when the cluster change request signal, FIG. 16C, goes high, the address counter 612 reaches the count N. The counts of the address counters 610 and 612 are transferred to the data comparator 629. When the address counter 612 reaches N, the output signal A=B, FIG. 16E, of the data comparator 629 goes low indicating that a comparison of the address counters 610 and 612 is equal.

The coincidence signal A=B from the data comparator 620 is delivered to the flip-flop 622. As the code counter 632 outputs a cluster change request signal associated with the (N+1)-th cluster, the flip-flop 622 turns the cluster over signal thereof from high to low with the result that the transfer of data from the tristate buffer 638 to the memory card 18 is stopped. Also, on the turn of the cluster over signal from high to low, the address counter 612 is reset.

Further, the cluster over signal is fed to the AND gate 630. The AND gate 630 ANDs the cluster over signal and the cluster change request signal from the code counter 632 to produce the signal C-BUSY. At the time when the address of the N-th cluster is fed, i.e., when the cluster change request signal goes high, the cluster over signal has already gone high. Hence, by ANDing the two signals, the AND gate 630 outputs the signal C-BUSY on the start of delivery of video data meant for the N-th cluster. As result, video data meant for the N-th cluster is outputted by the code/decode 628. When the video data meant for the N-th cluster has been fully outputted, the signal C-BUSY again goes low with the result that the code/decode 628 stops outputting video data. In this manner, after the transfer of the data associated with the N-th cluster, the cluster over signal goes low and, therefore, the signal C-BUSY remains in a low level although the cluster change request signal may go high, and inhibit the code/decode 28 from outputting video data. This prevents video data means for the (N+1)-th cluster from being outputted. For example, when the code/decode 628 has failed, the code/decode 628 is prevented from outputting more than N clusters of data.

As stated above, this embodiment prevents video data exceeding the capacity of a given number of clusters from being written to the memory card 18 when the code/decode 628 or a similar section of the apparatus has failed. Hence, a recording is confined in a given number of clusters so that necessary data stored in the memory card 18 is free from destruction. In addition, the code/decode 628 is prevented from outputting excessive coded data.

While the present invention has been shown and described in relation to an apparatus for recording video data by compression, it is similarly applicable to an apparatus for recording audio data by compression. When applied to an audio data recording apparatus, the present invention will cut the recording of audio data at a predetermined length. This is successful in confining even compressed audio data whose length is not constant in a given number of clusters. The illustrative embodiments of the present invention are practicable not only with compressed data but also non-compressed data.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A picture recording apparatus for writing a unit of video data in a storing medium having a plurality of storing units each of which has a predetermined storage capacity for storing therein at least part of the unit of video data, the apparatus comprising:

a processing circuit which receives a unit of video data and sequentially outputs the unit of video data to be stored in the storing medium;

a data amount determining circuit interconnected to said processing circuit which determines when part of the unit of video data which is substantially equal in amount to said predetermined storage capacity has been output from said processing circuit and outputs a first signal in response thereto;

said processing circuit halting the output of the unit of video data in response to said first signal;

a storage circuit for storing in a predetermined order identifications each representative of a different one of the plurality of storing units which is available for storing data; and a control circuit for controlling said storage circuit and storing the unit of video data sequentially output from said processing circuit in available ones of the plurality of storing units;

said control circuit, before storing the unit of video data in the storing medium, searching the storing medium for available ones of the plurality of storing units to store in said storage circuit the identifications associated with the available storing units searched for and required for storing the unit of video data, said control circuit reading out one of the identifications stored in said storage circuit to cause at least part of the unit of video data to be transferred to the storing medium to be stored in one of the plurality of storing units associated with the one of the identifications read out, said processing circuit halting the output of a remaining part of the unit of video data which remains not output in response to said first signal, said control circuit reading out another one of the identifications which follows the one of the identifications in the predetermined order in said storage circuit, and causing said processing circuit to start the output of the remaining part of the unit of video data to thereby store at least part of the remaining part of the unit of video data into another one of the plurality of storing units associated with the another one of the identifications.

2. A picture recording apparatus as claimed in claim 1, further comprising:

an address generating circuit in said control circuit which reads out the identifications from said storage circuit and outputs addresses of the plurality of storing units in said storing medium on the basis of the identifications read out; and a selector circuit in said control circuit which selects one of an output of said address generating circuit and an output of said processing circuit in response to the first signal, and selectively connects a selected output to the storing medium and the storing medium to said storage circuit; and a bus connecting said selector circuit to the storing medium for sequentially conveying the unit of video data, the addresses and the identifications;

said control circuit causing said selector circuit to connect the storing medium to said storage circuit when searching the storing medium for available ones of the plurality of storing units, and to connect the output signal selected by said selector circuit to said bus when storing the unit of video data in the storing medium.

3. A picture recording apparatus as claimed in claim 2, wherein said selector circuit comprises:

a first selector which selectively outputs one of the output of said address generating circuit and the output of said processing circuit in response to the first signal; and a second selector which selectively connects one of an output of said first selector and an output of said storage circuit to the storing medium;

wherein said control circuit causes, when searching for available storing units in the storing medium, said second selector to connect said storage circuit to the storing medium while storing the identifications in said storage circuit, and then causes said second selector to select the output of said first selector, and wherein said first selector, in response to the first signal, selects the output of said address generating circuit before said control circuit feeds another one of the identifications to said address generating circuit, selects the output of said processing circuit when said control circuit has fed another one of the identifications to said address generating circuit, and selects the output of said address generating circuit.

4. A picture recording apparatus as claimed in claim 2, wherein said control circuit determines whether or not said storage circuit contains identifications corresponding to a continuous series of available ones of the plurality of storing units and stores therein the unit of video data, said control circuit causing, when said storage circuit contains identifications corresponding to a continuous series of available storing units, said address generating circuit generates a leading address which designates a top storage location in a first one of the series of available storing units in the predetermined order, and generates a second signal to cause said data amount determining circuit and said address generating circuit to stop further operations thereof.

5. A picture recording apparatus as claimed in claim 2, further comprising a connector for detachably connecting said bus to the storing medium.

6. A picture recording apparatus as claimed in claim 5, wherein the storing medium is a memory card.

7. A picture recording apparatus as claimed in claim 1, wherein said data amount determining circuit further comprises a comparing circuit which compares in number the identifications input to said storage circuit with the identifications output by said storage circuit;

said data amount determining circuit outputting the first signal when said comparing circuit determines when the identifications output from said storage circuit have reached in number the identifications input to said storage circuit.

8. A picture recording apparatus as claimed in claim 7, wherein said comparing circuit comprises a first and a second counter and a comparator, said first counter counting the identifications input to said storage circuit, said second counter counting the identifications output from said storage circuit, said comparator comparing a count of said second counter with a count of said first counter to output the first signal when the count of said first counter is equal to the count of said second counter.

9. A picture recording apparatus as claimed in claim 1, wherein said processing circuit comprises a coder for compression-coding the unit of video data received by said processing circuit.

10. A picture recording apparatus as claimed in claim 1, wherein the unit of video data is of a predetermined length of data.

11. A picture recording apparatus as claimed in claim 1, wherein each of the plurality of storing units is assigned a different number from each other.

12. A picture recording apparatus as claimed in claim 11, wherein each of the identifications is equal to the number of respective one of the plurality of storing units and forms a more significant portion of the address of a top storage location of the respective storing unit.

13. A picture recording apparatus as claimed in claim 1, wherein said storage circuit is separate from the storing medium.

14. A picture recording apparatus as claimed in claim 1, wherein said storage circuit comprises a temporary storage device.

15. A method of recording a picture in the form of video data, comprising the steps of:

(a) preparing a storing medium having a plurality of storing units each of which has a predetermined storage capacity for storing therein at least part of a unit of video data;

(b) preparing a picture recording apparatus for writing a unit of video data in the storing medium and comprising a storage circuit for storing therein a predetermined order identifications each representative of different one of the plurality of storing units which is available to store data;

(c) searching by the picture recording apparatus, before storing the unit of video data in the storing medium, the storing medium for available ones of the plurality of storing units and storing in the storage circuit the identifications associated with the available storing units searched for and required for storing the unit of video data;

(d) receiving a unit of video data by the picture recording apparatus, and sequentially outputting therefrom the unit of video data to be stored in the storing medium;

(e) reading out one of the identifications stored in the storage circuit by the picture recording apparatus to cause at least part of the unit of video data to be transferred to the storing medium to be stored in one of the plurality of storing units associated with the one of the identifications read out;

(f) storing the unit of video data output in step (d) in available ones of the plurality of storing units;

(g) determining when part of the unit of video data which is substantially equal in amount to the predetermined storage capacity has been output in said step (d) and outputting a first signal;

(h) halting, in response to the first signal, outputting a remaining part of the unit of video data which remains not output;

(i) reading out another one of the identifications which follows the one of the identifications in the predetermined order in the storage circuit; and (j) restarting outputting of the remaining part of the unit of video data to thereby store at least part of the remaining part of the unit of video data into another one of the plurality of storing units associated with the another one of the identifications.

16. A method of recording, as claimed in claim 15, wherein said-step (j) further comprises the step of:

(k) reading out the identifications from the storage circuit to generate addresses of the plurality of storing units in the storing medium on the basis of the identifications read out.

17. A method of recording, as claimed in claim 15, further comprising the steps of:

(l) determining whether or not the storage circuit contains identifications corresponding to a continuous series of available ones of the plurality of storing units to storing therein the unit of video data;

(m) generating, when the storage circuit contains identifications corresponding to a continuous series of available storing units, a leading address which designates a top storage location in a first one of the series of available storing units in the predetermined order, and a second signal; and (n) stopping said steps (g) and (k) in response to the second signal.

18. A method of recording, as claimed in claim 15, further comprising the steps of:

(o) counting the identifications input to the storage circuit;

(p) counting the identifications output from the storage circuit; and (q) comparing a count established in the step (p) with a count established in said step (o) to produce the first signal when the count established in said step (p) is equal to the count established in said step (o).

19. A method of recording, as claimed in claim 15, wherein said step (d) further includes the step of compression coding the unit of video data received in said step (d).

* * * * *